Oct. 23, 1934.  H. C. DRAKE  1,978,252
FLAW DETECTOR FOR BOILER WELDS
Filed Oct. 25, 1930  2 Sheets-Sheet 1
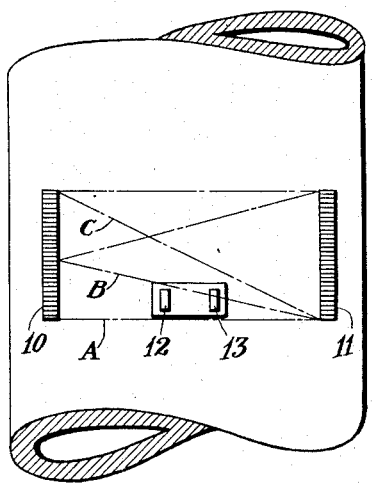
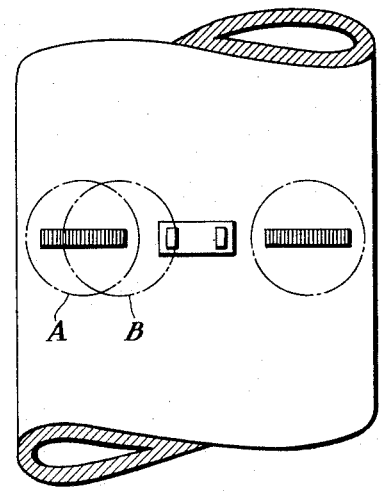
INVENTOR
Harcourt C. Drake
BY
ATTORNEY Oct. 23, 1934.　　　　H. C. DRAKE　　　　1,978,252

FLAW DETECTOR FOR BOILER WELDS

Filed Oct. 25, 1930　　　2 Sheets-Sheet 2

INVENTOR
Harcourt C. Drake
BY
*Joseph H. Lipschutz*
ATTORNEY

Patented Oct. 23, 1934

1,978,252

UNITED STATES PATENT OFFICE 1,978,252

FLAW DETECTOR FOR BOILER WELDS

Harcourt C. Drake, Hempstead, N. Y., assignor to Sperry Products, Inc., Brooklyn, N. Y., a corporation of New York Application October 25, 1930, Serial No. 491,148

7 Claims. (Cl. 175—183)

This invention relates to means for detecting flaws in metallic or other electric conducting plates and is particularly designed for the detection of flaws in boiler plate. A still more specific application of the invention is the detection of flaws in boiler welds.

This invention is the result of a long series of experiments and a continuous development of a process for successfully detecting flaws in boiler welds. At the very beginning of this investigation, current was passed through a section of the boiler, including the weld, to establish an electro-magnetic field surrounding that portion and then a pair of opposed induction coils were moved through the electro-magnetic field so that when a flaw was encountered, a differential E. M. F. was generated which was then caused to actuate an indicator. This was a further application of the principle of flaw detection of electric conductors disclosed in the patent of Elmer A. Sperry, No. 1,820,505, granted August 25, 1931. Many difficulties were encountered, however, due to the fact that any variations in brush contact resulted in a displacement of the electro-magnetic field and such displacement affected the detecting coils operating in said field in the same manner as a flaw. The plan was finally evolved whereby the brushes which led the current into and out of the boiler plate across the weld were placed on one surface of the boiler plate while the detecting coils were caused to operate along the other surface, that is to say, the brushes and the coils were placed on opposite sides of the boiler plate. This had the effect of causing the boiler wall to act as a shield which filtered out any variations in the flow of current due to the varying contact of the brushes and allowed a constant electro-magnetic field to be maintained in the under surface.

It is a further object of my invention to disclose the means whereby in a structure such as outlined above, that is, with the brushes and coils co-acting with opposite surfaces of the boiler, means may be provided whereby the brushes and coils may be moved along the boiler weld, that is, axially of the boiler, while maintaining a fixed relation to each other. It will be understood that either the boiler may be moved while the brushes and coils remain fixed, or the boiler may be held in fixed position and the brushes and coils moved. It is only in the latter construction that this feature of my invention, that is, of maintaining a constant relation between the moving brushes and coils, applies.

It is a further object of my invention to provide an indicating means, including a moving chart and means whereby said chart may be set in motion at the same time that the boiler or the brushes and coils are set in motion.

It is a further object of my invention to provide a plurality of sets of detecting coils arranged either in series or in parallel, so as to completely cover the area of the boiler weld.

Other objects and advantages of my invention will become apparent in the following detailed description thereof.

In the accompanying drawings,

Fig. 1 is a plan view illustrating one stage in the development of this invention.

Fig. 2 is a view similar to Fig. 1 and illustrating a second stage in the development of this invention.

Referring to Fig. 1 of the drawings, I have shown one step in the development of this invention which illustrates why the said form of testing device failed. It will be seen that when the row of brushes 10, which were arranged axially of the boiler, made non-uniform contact with the boiler, the axis of current between said brushes and brushes 11 definitely shifted, causing a shifting of the electro-magnetic field and an unsymmetrical field so that the detecting coils 12, 13 cut a different number of lines of force in their progress along the boiler, which gave indications like that due to a flaw. That is to say, instead of both coils striking a uniform field A, one coil would be cutting more lines of force than the other, in field B or C, for instance, so that a differential E. M. F. would be induced and transmitted to the amplifier for operating a relay and pen on a chart. Thus an indication of a flaw would be obtained where none existed.

It was then decided to arrange the brushes radially rather than axially and while this gave a constant current across the portion of the weld being tested, a non-uniform contact by the brushes caused a displacement of the field with respect to the detecting coils from position A to position B, for instance, and hence again gave an indication of flaw where none existed.

Figure 3:
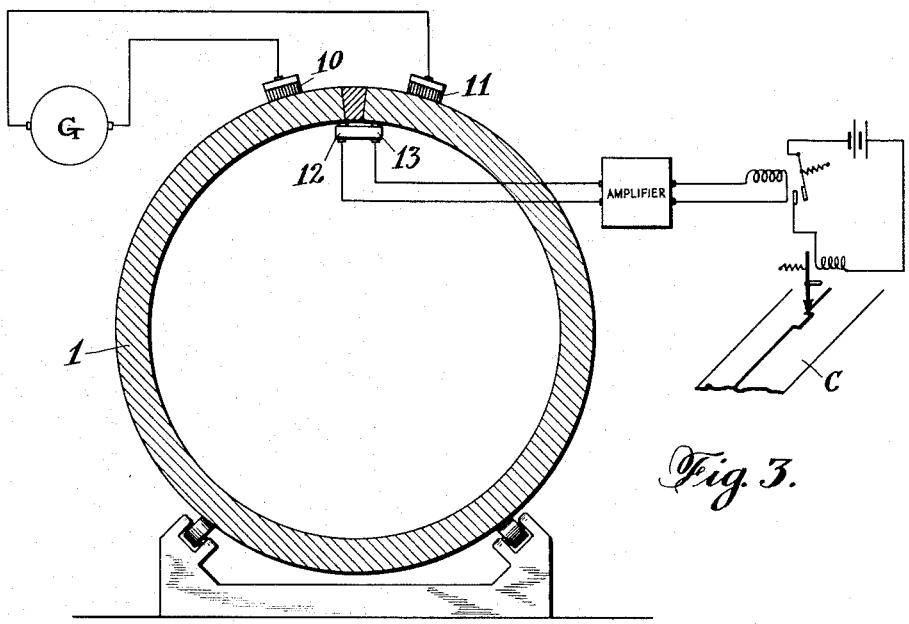
Fig. 3 is a vertical section through a welded boiler, and partly diagrammatic, showing my invention applied thereto.

This led to the form of the invention disclosed in Fig. 3. Here it will be noted that the brushes 10, 11 are arranged in contact with the upper surface of the boiler 1 for leading current into and out of the welded portion of the boiler, while the detecting coils 12, 13 co-act with the other surface of the boiler. It was found that the boiler acted as an effective shield for filtering out variations in the position of the electro-magnetic field due to non-uniform contacting of the brushes, so that only flaws would affect the detecting coils.

Figure 6:
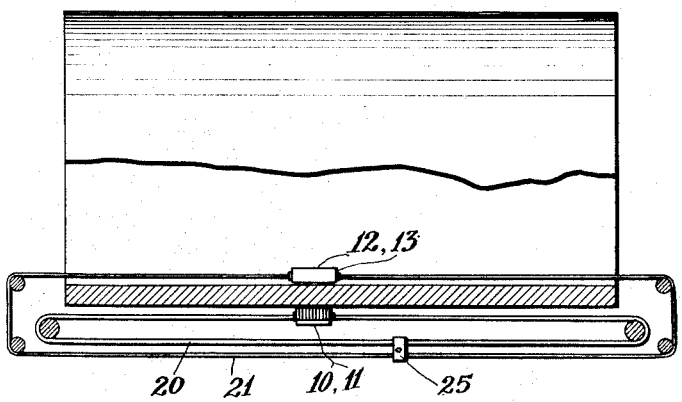
Fig. 6 is a view, largely diagrammatic, disclosing a means whereby the brushes and coils may be moved with respect to the stationary boiler while maintaining a fixed relation to each other.

The boiler could be supported in any suitable manner, either fixedly, in which case the brushes and coils would be moved axially along the weld, or movably, in which case the brushes and coils would remain stationary. In either case the same relative movement is obtained. In the case where the boiler remains fixedly supported while the brushes and coils are moved therealong, the arrangement shown in Fig. 6 may be utilized for insuring a constant relationship between the brushes and the coils in spite of such movement. This system consists of a pulley arrangement so that the brushes and coils will move in the same direction at exactly the same rate and, therefore, maintain their fixed relationship. Said pulley arrangement may comprise two complete parallel pulley circuits 20, 21, one for the brushes 10, 11 and the other for the coils 12, 13. The parallel pulley circuits are interconnected at one point 25 joining the return strands of each circuit, thus insuring the same movement between the brushes and the coils both as to rate of movement and direction.

Figures 4, 5:
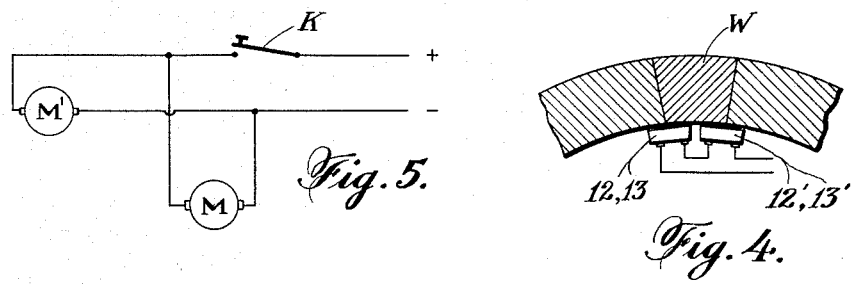
Fig. 4 is a sectional view of the welded portion of the boiler and disclosing a plurality of sets of detecting coils co-operating therewith.
Fig. 5 is a wiring diagram disclosing the means for obtaining simultaneous actuation of the recording chart and the moving boiler or detecting mechanism.

Since the weld within a boiler plate extends over a substantial area, it may be found desirable to use several sets of detecting coils 12, 13, 12', 13' connected in series or in parallel, extending across the weld W, as shown in Fig. 4.

The chart C is designed to be moved at a rate which bears a fixed relation to the relative movement between the boiler, on the one hand, and the brushes and coils, on the other. To insure simultaneous operation of the chart and the moving mechanism, whether such moving mechanism moves the boiler or the coils and brushes, I may use the wiring diagram of Fig. 5, which shows that the motor M for driving the moving mechanism of either the boiler or the brushes and coils is arranged in parallel with the motor M' for driving the recording chart. When the operator presses the starting key K, both motors are set in operation simultaneously and both are stopped when the key is moved to open the circuit.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A flaw detector for boiler welds, comprising current conducting brushes adjacent the weld on opposite sides thereof for passing current through the weld, means responsive to displacements of the current axis, said brushes and said means operating along opposite surfaces of said weld, and means for moving said boiler weld and said brushes and responsive means relatively.

2. A flaw detector for boiler welds, comprising current conducting brushes adjacent the weld on opposite sides thereof for passing current through the weld, means responsive to displacements of the current axis, said brushes and said means operating along opposite surfaces of said weld, and means for moving said boiler weld with respect to the stationary brushes and responsive means.

3. A flaw detector for boiler welds, comprising current conducting brushes adjacent the weld on opposite sides thereof for passing current through the weld, means responsive to displacements of the current axis, said brushes and said means operating along opposite surfaces of said weld, and means for moving said brushes and responsive means with respect to the stationary boiler.

4. A flaw detector for boiler welds, comprising current conducting brushes adjacent the weld on opposite sides thereof for passing current through the weld, means responsive to displacements of the current axis, said brushes and said means operating along opposite surfaces of said weld, and means for moving said brushes and responsive means in fixed relation to each other with respect to the stationary boiler.

5. A flaw detector for boiler welds comprising a pair of electrodes on one surface of the boiler adjacent the weld for passing current therethrough, and means adjacent to the other surface of the boiler and extending over the width of said weld, said last named means being responsive to variations in flux through said weld.

6. A flaw detector for boiler welds comprising a pair of electrodes on one surface of the boiler adjacent the weld for passing current therethrough, and a plurality of means adjacent the other surface of the boiler and extending over the width of said weld, each of said last named means being responsive to variations in flux through said weld.

7. A flaw detector for boiler welds comprising a pair of electrodes on one surface of the boiler adjacent the weld for passing current therethrough and a plurality of interconnected means adjacent the other surface of the boiler and extending over the width of said weld, each of said last named means being responsive to variations in flux through said weld.

HARCOURT C. DRAKE.